Dec. 1, 1953   C. W. FRENCH   2,660,944
VENT DOOR CONTROL MECHANISM
Filed Feb. 6, 1952   2 Sheets-Sheet 2

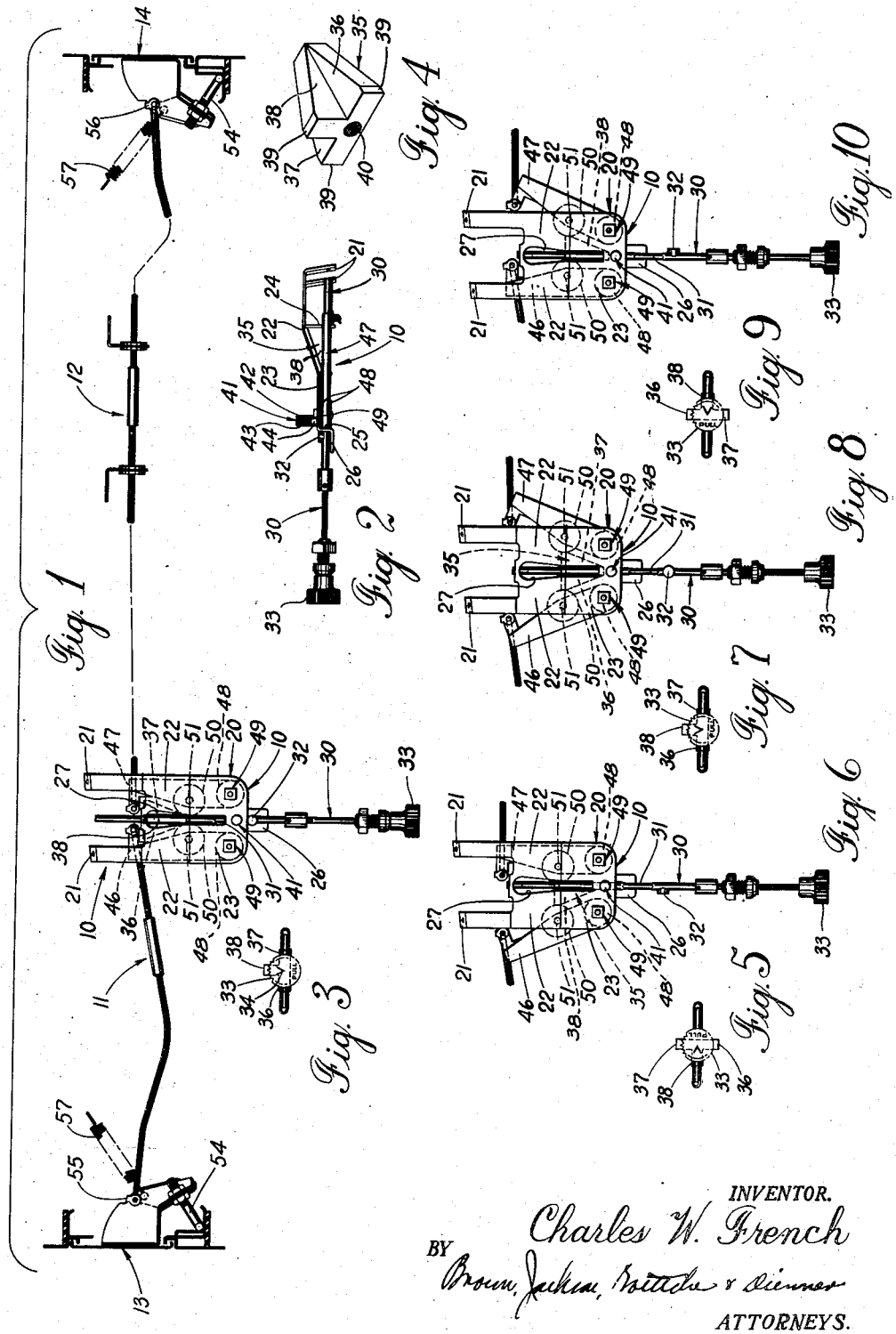

INVENTOR.
Charles W. French
BY
ATTORNEYS.

Patented Dec. 1, 1953

2,660,944

UNITED STATES PATENT OFFICE 2,660,944

VENT DOOR CONTROL MECHANISM

Charles W. French, Alhambra, Calif., assignor to The Studebaker Corporation, South Bend, Ind., a corporation of Delaware Application February 6, 1952, Serial No. 270,230

3 Claims. (Cl. 98—2)

My present invention is directed to a new and useful mechanism for controlling the simultaneous or individual actuation of a pair of vent doors of the type familiarly used in the sides of an automotive body cowl section for admitting fresh air to the interior of the automobile or like vehicle.

More particularly my present invention is concerned with a new and improved actuating mechanism for translating the rectilinear motion of an operating push-pull rod and cam arrangement to a pair of pivotal actuating arms, which actuate linkage systems rectilinearly movable in substantially transverse relation to the axis of rectilinear movement of the push-pull rod, whereby I am enabled to control the operation of remotely positioned parts actuated by the linkage systems, such as the control of cowl vent doors in an automobile or the like.

Although the mechanism which I am about to set forth is particularly adaptable for use in actuating a pair of separated and remotely positioned cowl vent doors in an automobile body or the like, it will be recognized that the features of the control mechanism of my invention are adaptable for other uses, wherein it is desired to transmit a given rectilinear motion to linkages arranged substantially transversely of the axis of said rectilinear motion as will be recognized by one familiar with the art.

The main object of my present invention is to disclose a new and improved mechanism for controlling the opening and closing movement of a pair of cowl vent doors for an automobile body or the like.

A further object of my invention is to demonstrate the features of a new and improved cam means mounted for rotary and rectilinear motion whereby I am able to simultaneously or individually actuate and control rectilinear motion of a pair of linkage systems, actively associated therewith, in transverse relation to the path of rectilinear motion of the cam.

The above and further objects and advantages of my present invention will be recognized by one familiar with this art from the following description thereof and with reference to the accompanying drawings.

In the drawings:

Figure 1 is a schematic plan representation of an installation utilizing the features of my invention for controlling the opening and closing movements of a pair of automotive body cowl vent doors, or the like;

Figure 2 is a side elevational view of my new control mechanism illustrated in the plan view Figure 1;

Figure 3 is an end elevational view of the control mechanism shown in Figures 1 and 2, looking at such from the operator's position;

Figure 4 is a perspective view of the new and improved cam means utilized in my control mechanism as illustrated in Figures 1 through 3;

Figure 5 is a schematic end elevational view of the control mechanism of my invention illustrating the position of the operating knob and actuating cam means therein for independently actuating the left hand cowl vent door as shown in the schematic illustration of Figure 1;

Figure 6 is a plan view of my new control mechanism, showing the parts thereof in position for opening the left hand cowl vent of Figure 1;

Figure 7 is an end elevational view, similar to Figure 5, demonstrating the position of my control knob and cam means for the simultaneous actuation of both of the cowl vent doors illustrated in schematic Figure 1;

Figure 8 is a top plan view of the control mechanism shown in Figure 1, illustrating the position of the parts thereof for opening both cowl vent doors of Figure 1;

Figure 9 is an end elevational view similar to Figures 5 and 7, illustrating the position of the control knob and cam means associated with my new and improved control mechanism for selectively and individually operating and opening the right hand cowl vent door illustrated in Figure 1 of the drawing;

Figure 10 is a top plan view of the control mechanism of Figure 1, showing the position of the parts therein when such are arranged to open individually the right hand cowl vent door of Figure 1;

Figure 11:
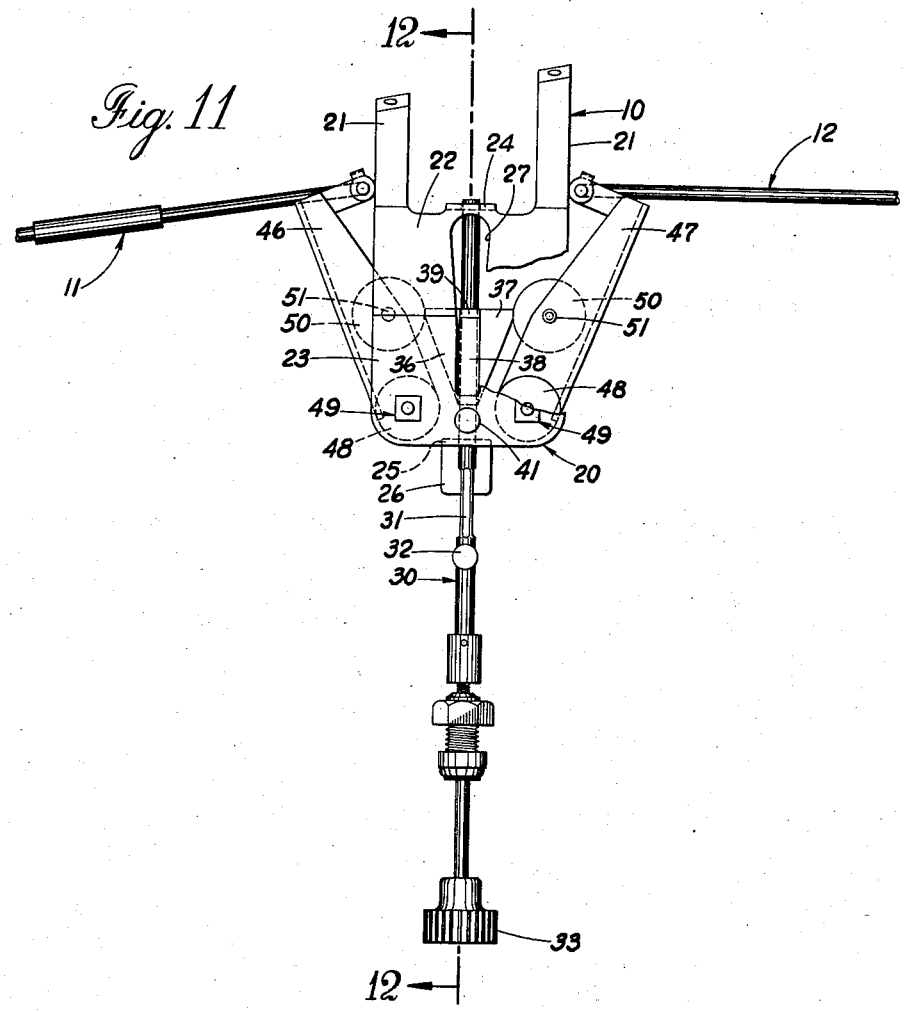
Figure 11 is a top plan view, with parts broken away, showing the control mechanism of my invention, similar to its showing in Figure 1, but at an enlarged scale thereover.
Figure 12:
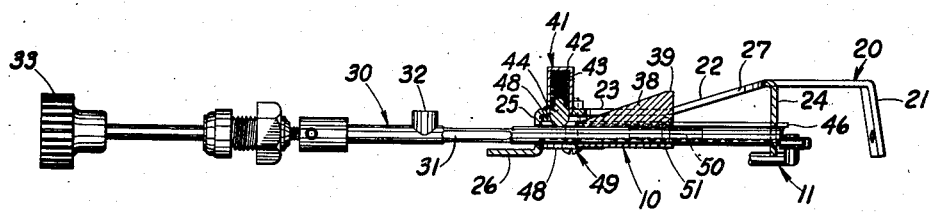
Figure 12 is a view in longitudinal cross-section taken substantially along line 12, 12 of Figure 11.

Referring now to Figures 1 through 4 of the drawings, it will be recognized that my new and improved control mechanism, indicated generally at 10, is designed to actuate a pair of similar actuating linking systems comprising rod members 11 and 12 connected with the control mechanism in a manner to operate left and right hand cowl vent doors 13 and 14, respectively.

Particularly my mechanism 10 includes a main supporting bracket member 20 distinguished at one end by a pair of mounting finger portions 21, 21 which extend in bifurcated relation outwardly from an inclined throat portion 22 bent in angular disposition from a substantially horizontal main body portion 23 of the bracket. The finger portions 21 are suitably turned downwardly and apertured adjacent their outer ends for connecting the mounting bracket 20 to the cowl panel or beneath the dashboard of an automobile or the like. Bracket 20 is further provided with a narrow front wall portion 24 turned downwardly from the upper edge of the inclined throat portion 22 thereof and intermediate the two separated finger portions 21. A similar rear wall 25 depends, in parallel relation to wall 24, from the trailing edge of the bracket's main body portion 23 and such is turned outwardly adjacent its lower end, to form a transversely related and substantially horizontal ear portion 26 which lies in parallel offset relation to the bracket's main body portion 23. It will be appreciated that the several portions of the bracket 20 described hereabove are all integrally related and best formed as a unitary stamping, or the like, from sheet steel or similar sturdy materials. Further, it will be recognized that an elongated opening 27 is stamped out of the bracket's main body and inclined throat portions and that such is disposed centrally and longitudinally thereof for purposes which will appear later herein.

The two wall portions 24 and 25 of the bracket 20 are provided with registeringly aligned central apertures for receiving and guiding a substantially cylindrical push-pull actuating rod 30 which rod is provided with a square cross-sectional portion 31 intermediate its ends. The rod 30 is further provided with an outwardly projecting stop member 32 located just to the rear of the squared portion 31 thereof, with such stop member being aligned in transverse relation to one of the planar surfaces of the rod's squared portion 31, for reasons which will be amplified hereinafter. The stop member 32 is used to limit rectilinear motion of the rod 30 toward the bracket 20 by interfering with the passage thereof through the apertured rear wall 25. The stop also limits rotational movement of the push-pull rod 30 by interfering with the underlying and adjacently positioned planar ear portion 26 of the mounting bracket 20 when such stop member lies adjacent the rear wall 25 of the bracket.

The outer or rearward end of the push-pull rod 30 is provided with a manual operating knob 33 which is to be grasped by the user to impart rectilinear or rotary movement to the rod 30 in the operation of my mechanism 10, as will be recognized presently. Knob 33 is further provided with a suitable index marker 34 which is aligned with the projecting stop member 32 in the properly mounted position of knob 33 at the outer end of rod 30.

Adjacent the opposite or inner end of the push-pull rod 30 is mounted my new and improved cam means 35 which is illustrated clearly in Figure 4 of the drawings. As will be recognized from this figure, cam 35 comprises three integrally joined and similarly shaped triangular lobe portions 36, 37 and 38, with lobes 36 and 37 being arranged in coplanar relation and lobe 38 extending transversely and centrally outward from the plane of the lobes 36 and 37. As illustrated, each of the cam lobes is shaped substantially as a right triangle with the lobes being commonly joined along their right angle sides so that their base sides diverge outwardly and their apexes lie adjacent. The hypotenuse side of each of the triangular lobes comprises an inclined camming surface therefor. The outermost vertice or corner of each lobe, formed by the junction of the base side and hypotenuse side thereof, is suitably cut off to form a planar surface 39 which lies in parallel relation to the longitudinal axis of the composite cam member 35. In order to mount the cam member 35 coaxially on the push rod 30, a central axial opening 40 is provided longitudinally thereof. Cam 35 is therefore adaptable to be slipped over the inner end of rod 30 and rigidly connected intermediate the ends of the latter with its apexual end lying toward the operating knob 33. Rigid connection of the cam member 35 to rod 30 may be accomplished by any suitable means such as spot welds, a key connection, or the like.

To insure proper operation of the cam 35 in response to rectilinear and rotational movement of push-pull rod 30, in the particular embodiment of my invention illustrated herein, it is essential that the stop member 32, operating knob index marker 34, and the intermediate cam lobe 38 be aligned in substantially coplanar relation when mounting the same in bracket 20. Further, it will be recognized that the intermediate cam lobe 38 is aligned immediately below the elongated central opening 27 of the bracket to project thereinto and be drawn rearwardly by the push-pull rod 30 when my mechanism is conditioned to simultaneously actuate doors 13 and 14, as illustrated in Figures 1 and 3 of the drawings. The cam 35 is further positioned on rod 30 so that when the push rod is moved toward bracket 20 to bring the stop member 32 thereof against the bracket's rear end wall 25, the leading edge of the cam will substantially abut or contact the front wall 24 of the bracket. Thusly mounted on rod 30, it is possible, by indexing the control knob 33 and cam 35 to its Figure 5 or 9 positions, to align one of the coplanar cam lobes 36 and 37, for guided reception in the slotted opening 27, as will be amplified later herein.

It will be realized that the indexing or rotational movement of the push-pull rod and the cam member 35 normally takes place when the push-pull rod is at its innermost position with the cam member lying substantially below the inclined throat portion 22 of the bracket. In order that the several indexed positions for the cam member 35 can be maintained until the push-pull rod is pulled rearwardly by the operator to bring one of the cam lobes thereof into guided engagement with the slotted opening 27, I have provided a spring loaded detent means 41 comprising a cylindrical cap 42 mounted rigidly to the main body portion 23 of the bracket in transverse alignment with the longitudinal axis of movement for the push rod 30. The detent means 41 further comprises an internal spring 43 loaded above a plug 44, or the like, the latter of which is movable through a suitable aperture formed in the bracket's main body portion whereby the lower end of the plug resiliently bears against the push-pull rod and acts as a means for engaging the flattened surfaces of the squared portion 31 of the push-pull rod to prevent accidental rotation of rod 30 when such is in its Figure 1 or "in" position.

Mounted to the underside of the bracket's main body portion 23 are two similar actuating arms 46 and 47, one positioned on either side of the push-pull rod 30 carried by the bracket. The arms 46 and 47 are each pivotally connected at one end to the bracket member 20 and carried between a pair of washers 48, 48 by a nut and bolt fastener indicated generally at 49. Each of the actuating arms further is formed as a channel stamping or the like, open along one edge, for receiving a rotatable contact roller 50. The contact rollers 50 are each suitably fastened to their respective actuating arms by means of an axle rivet member 51 which is rigidly fastened to and extends transversely between the spaced walls of the channel shaped actuating arm 46 or 47 to which such is attached.

Further, it will be appreciated that the rollers 50 extend laterally outward of the actuating arms, adjacent opposite sides of the push-pull rod 30, so as to permit rolling engagement thereof with the camming edges or surfaces of the several cam lobes 36 through 38.

The actuating link systems 11 and 12 are each pivotally connected to the outer end of one of the actuating arms 46 and 47, respectively, for actuating the vent doors 13 and 14, respectively associated therewith. It will be appreciated that each of the doors 13 and 14 is mounted in a conventional manner for pivotal actuation about a vertical pivotal axis formed by a mounting connection rod 54, as illustrated in particular in Figure 1 of the drawings. It further will be recognized that the outer ends of each of the link systems 11 and 12 is pivotally connected to its respectively associated vent door by pivotal connectors 55 and that a spring member 57 is provided adjacent each of the pivotal connectors 55; such spring having one end anchored to its associated vent door and its opposite end anchored to a suitable supporting member, such as the automotive cowl panel or the like. Each of the springs 57 is so designed and connected to its associated vent door as to oppose opening movement thereof.

Use and operation

To utilize my control mechanism 10, heretofore described, it is essential to appreciate that such is adapted to actuate the two vent doors 13 and 14 either simultaneously or individually by pulling the rod member 30 rearwardly away from bracket 20 for engaging cam 35 with the contact rollers 50. Simultaneous or independent engagement of the two roller members 50 by the cam lobes, and thus the eventual related simultaneous or independent actuation of the vent doors associated therewith via the intervening linkage systems and actuating arms, is determined by the selective positioning of the cam lobes as determined by rotational movement of the operating push rod to one of three operating positions, as illustrated in Figures 5 through 10 of the drawings.

With reference to Figures 5 and 6 of the drawings, it will be observed that when cam member 35 is positioned with its coplanar cam lobes 36 and 37 in a vertical disposition, as dictated by rotary movement of the operating push rod 30 and as indicated when the knob index marking 34 appears at the left hand side of the knob to the operator, and the stop member 32 engages the ear portion 26 of bracket 20, the intermediate cam lobe 38 will be in position to engage roller 50 mounted on the left door actuating arm 46. With cam lobe 38 in this position, rearward rectilinear movement of the actuating rod 30, as effected by pulling the same outwardly toward the operator until such reaches its Figure 6 position, causes a responsive arcuate motion of actuating arm 46 outwardly from the bracket 20 (or in a counterclockwise direction as viewed in plan Figure 1) to rectilinearly push the linkage system 11 against the force of the tension spring 57 associated with the left hand vent door 13, thereby to effect opening movement of the latter about its pivotal axis 54. In this manner, the selective and individual opening operation of the left hand vent door 13 is carried out. Of course, it will be understood that by pushing the operating push rod 30 toward the bracket 20, or from its Figure 6 position to that as shown in Figure 1 of the drawings, roller member 50 of the actuating arm 46 disengages with the cam lobe 38 to permit closure of vent door 13 as effected by the return force exerted by its associated spring member 57.

With reference to Figures 7 and 8 of the drawings, it will be recognized therefrom that a schematic representation of the control mechanism of my invention, similar to that illustrated in Figures 5 and 6, has been set forth. As demonstrated in Figure 7, with the rotational movement of the push rod 30 to a position wherein the coplanar cam lobes 36 and 37 are substantially coplanar with arms 46 and 47, rectilinear movement of the push rod toward the operator or away from bracket 20, effects simultaneous opening of the two vent doors 13 and 14 in a manner similar to that described hereabove in connection with the individual operation of vent door 13. However, it will be appreciated that with the cam 35 in its Figure 7 position, both of the contact rollers 50 are engaged to pivotally actuate both of the actuating arms 46 and 47 simultaneously in response to their rolling contact with the cam lobes 36 and 37. Simultaneous closure of the two doors 13 and 14 is again effected by pushing the operating rod 30 toward the bracket 20 or away from the operator to disengage the contact rollers and the cam lobes 36 and 37 permitting spring members 57 to effect closure of the vent doors.

With reference to Figures 9 and 10 it will be recognized that by rotating push rod 30 so that the index marker 34 thereon appears adjacent its right hand side, as viewed by the operator and stop member 32 is engaging the bracket ear portion 26, the mechanism is in condition for individually and independently actuating the right hand vent door 14. Opening movement of vent door 14 is effected by pulling the push rod 30 toward the operator to engage cam lobe 38 with the roller 50 on the right door actuating arm 47. Closing movement of the right hand vent door is then gained by pushing the rod 30 inwardly to disengage the cam lobe 38 from the contact roller on the actuating arm 47, permitting the latter to pivot inwardly under the urging of the spring 57 mounted to door 14.

As related to the above three described operating conditions for my mechanism 10, it will be observed that when the operating push-pull rod 30 is withdrawn to its rearward limit, one of the cam lobes rides or is guided along the slotted opening 27 formed in the bracket member 20 thereby to guide and lock the cam 35 in its selected operating position. Prior to such rearward movement of rod 30 and the engagement of one of the cam lobes in slot 27, the detent means 41 serves to maintain cam 35 in its selected rotational position as dictated by the positioning of the index marker 34 and operating knob 33, this by engagement of the detent plug member with one of the flat surfaces of the rod's squared portion 31. It will be appreciated that the detent 41 serves to maintain this pre-operational selected position in a resilient manner until the operating knob 33 is turned to index the cam member 35 to a different operational position or until such rod is pulled rearwardly by the operator to engage one of the cam lobes in the guiding slotted opening 27 of the bracket member 20. It will further be appreciated that when the cam member 35 is moved rearwardly to its full limit of movement, or that is, when the push-pull rod 30 is pulled outwardly by the operator to its full extent, the flattened surfaces 39 on the roller engaging lobe portions of the cam are brought into substantial alignment with the vertical axes or rotational centers of the roller members 50, thereby serving to act as a detent or holding means for maintaining the vent doors in a fully open position against the force of the return springs 57.

Thus it will be appreciated that I have illustrated and described herein a new and improved control means for effecting the simultaneous or independent movements, both opening and closing, of a pair of vent doors familiarly found in the sides of an automotive body cowl section or the like. It will be appreciated however that the translation of rectilinear motion of a given axis to a pair of coaxially aligned or offset axes, arranged in substantial transverse relation to the axis of the actuating rectilinear motion, i. e. the axis of push rod 30 in the embodiment herein illustrated, involves principles and teachings which are readily adapted for use other than the one illustrated herein. Therefore, I do not wish to be limited to the specific embodiment herein described and illustrated except as may appear in the following appended claims.

I claim:

1. A mechanism of the class described, comprising in combination, a support bracket, a cam member carried by said bracket for rotational and rectilinear movement and having three triangular shaped lobes arranged with their apexual ends adjacent, two of such lobes being arranged in coplanar relation and the third lobe being disposed transversely intermediate the said two lobes, rod means connected axially with said cam selectively for actuating the same rectilinearly and rotatably, a pair of actuating arms pivotally mounted on said bracket and positioned in coplanar relation adjacent opposite sides of said cam, a contact roller rotatably mounted on each of said arms for engagement with the lobes of said cam, a pair of actuating linkages, one pivotally connected to the outer end of each of said arms and rectilinearly movable in response to the pivotal movement of said arms, and spring means biasing said arms toward one another and said cam, whereby operation of said rod means to position said two lobes in coplanar relation with said contact rollers followed by rectilinear movement of said cam in a selected direction serves simultaneously to actuate both of said linkages against the bias of said spring means and whereby alternate operation of said rod means to position said third lobe in engagement with one of said rollers followed by rectilinear movement of said rod in a selected direction, serves to actuate one of said linkages independently of the other.

2. A mechanism for controlling the opening and closing movements of a pair of automobile cowl vent doors or the like, comprising in combination, a bracket means, a pair of actuating arms pivotally mounted at like ends on said bracket means and in spaced coplanar relation, a pair of contact rollers, one mounted on each of said arms and extending outwardly of adjacent sides thereof, a cam member mounted on said bracket means and intermediate said two arms for rotary and rectilinear movement, said cam having three triangular shaped lobes, two of which lie in coplanar relation and the third of which projects transversely outward of the plane of said two lobes, all three lobes being arranged with their apexes adjacent; a push-pull rod slidingly attached to said bracket means and mounted coaxially with said cam for selectively effecting rectilinear and rotary movement of the latter as desired, spring means biasing said arms toward said cam to bring said rollers thereon in contact with the lobes of said cam, and linkage means connecting the outer movable end of each of said arms with one of the vent doors, whereby the doors simultaneously may be opened and closed in response to rectilinear movement of said cam in appropriate directions when the two coplanar lobes of the latter are arranged for simultaneous engagement with said rollers and whereby one of the doors may be opened and closed independently of the other in response to rectilinear movement of said cam when the third lobe thereof is selectively positioned by said push-pull rod in coplanar relation with said arms.

3. A mechanism for controlling simultaneous or independent opening and closing movements of a pair of automobile cowl vent doors or the like, comprising in combination, a supporting bracket having a plate member provided with depending front and rear wall portions at opposite ends thereof, a push-pull rod mounted through said two wall portions for rotational and rectilinear sliding movement, a cam member mounted rigidly on said rod, intermediate said two wall portions, and rectilinearly movable therewith to operative and inoperative positions, said cam having three outwardly projecting, like triangular lobe members arranged with their apexes adjacent, two of the lobes being coplanar and the third lobe extending transversely intermediate thereof; a pair of actuating arms pivotally connected at one end to said bracket's plate member and disposed adjacent opposite sides of said rod, a pair of contact rollers, rotatably mounted, one on each of said arms, for coplanar rotation about parallel axes related transversely to said arms, stop means on said rod, engageable with said bracket for limiting rotational indexing of said rod and cam when such are in their inoperative positions, detent means engageable with said rod in its said inoperative position for selectively arresting the rotational indexing of said cam thereby to align any one of said cam lobes transversely of said bracket's plate member and extending theretoward as desired, linkage means pivotally connecting the outer ends of each of said arms to one of the vent doors whereby the latter are actuated in response to pivotal movement of said arms, spring means connected to said linkage means for opposing opening movement of said doors and biasing said arms toward said cam, and means for locking said cam and rod against rotational movement, when such are moved to their operative position wherein either or both of said arms are pivoted away from said rod by engagement of said cam lobes with either or both of said rollers, comprising a slotted longitudinal opening formed in said bracket's plate member in registering alignment with said rod and adapted slidingly to receive the said one cam lobe aligned transversely of said plate member as said cam is rectilinearly moved into its operative position.

CHARLES W. FRENCH.

References Cited in the file of this patent

UNITED STATES PATENTS

| Number | Name | Date |
|---|---|---|
| 1,462,776 | Ubil | July 24, 1923 |
| 1,536,340 | Hammerl | May 5, 1925 |
| 1,641,561 | Whidden | Sept. 6, 1927 |